United States Patent
Yamaguchi

(10) Patent No.: US 10,564,611 B2
(45) Date of Patent: Feb. 18, 2020

(54) CONTROL SYSTEM AND MACHINE LEARNING DEVICE

(71) Applicant: FANUC CORPORATION, Minamitsuru-gun, Yamanashi (JP)

(72) Inventor: Takehiro Yamaguchi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 44 days.

(21) Appl. No.: 15/838,510

(22) Filed: Dec. 12, 2017

(65) Prior Publication Data
US 2018/0164756 A1  Jun. 14, 2018

(30) Foreign Application Priority Data
Dec. 14, 2016 (JP) .................. 2016-242572

(51) Int. Cl.
*G05B 13/02* (2006.01)
*G05B 19/408* (2006.01)
(Continued)

(52) U.S. Cl.
CPC .......... *G05B 13/027* (2013.01); *G05B 19/18* (2013.01); *G05B 19/4083* (2013.01);
(Continued)

(58) Field of Classification Search
CPC ............... G05B 13/027; G05B 19/414; G05B 2219/42018; G05B 19/18; G05B 19/4083;
(Continued)

(56) References Cited

U.S. PATENT DOCUMENTS

2005/0127051 A1\* 6/2005 Mori .................. B23K 26/0604
                                                    219/121.73
2007/0203871 A1\* 8/2007 Tesauro ................. G06Q 10/06
                                                    706/53
(Continued)

FOREIGN PATENT DOCUMENTS

JP         3-259303 A     11/1991
JP       H06274228 A      9/1994
(Continued)

OTHER PUBLICATIONS

Notification of Reasons for Refusal for Japanese Application No. 2016-242572, dated Jul. 17, 2018, with translation, 6 pages.

Primary Examiner — Rocio Del Mar Perez-Velez
Assistant Examiner — Brian D. Martin
(74) Attorney, Agent, or Firm — RatnerPrestia

(57) ABSTRACT

Provided are a controller and a machine learning device that perform machine learning to optimize the servo gain of a machine inside a facility in accordance with action conditions, action environments, and a priority factor of the machine. The control system observes machine information on a machine as state, acquires information on machining by a machine as determination data, calculates a reward based on the determination data and reward conditions, performs the machine learning of the adjustment of the servo gain of the machine, determines an action of adjustment of the servo gain of the machine based on the state data and a machine learning result of the adjustment of the servo gain of the machine, and changes the servo gain of the machine, based on the action of adjustment of the determined servo gain.

8 Claims, 4 Drawing Sheets

(51) Int. Cl.
*G05B 19/414* (2006.01)
*G05B 19/4155* (2006.01)
*G05B 19/18* (2006.01)
*G06N 3/00* (2006.01)
*G06N 3/08* (2006.01)

(52) U.S. Cl.
CPC ....... *G05B 19/414* (2013.01); *G05B 19/4155* (2013.01); *G06N 3/006* (2013.01); *G06N 3/084* (2013.01); *G06N 3/088* (2013.01); *G05B 2219/33034* (2013.01); *G05B 2219/33056* (2013.01); *G05B 2219/42018* (2013.01); *G05B 2219/42152* (2013.01)

(58) Field of Classification Search
CPC ...... G05B 19/4155; G05B 2219/42152; G05B 2219/33034; G05B 2219/33056; G05B 13/0265; G06N 3/08; G06N 3/006; G06N 3/084; G06N 3/088
See application file for complete search history.

(56) References Cited

U.S. PATENT DOCUMENTS

| | | | |
|---|---|---|---|
| 2008/0091446 A1* | 4/2008 | Vengerov | G06Q 10/06 705/28 |
| 2009/0099985 A1* | 4/2009 | Tesauro | G05B 13/0265 706/12 |
| 2009/0187641 A1* | 7/2009 | Li | H04L 41/0816 709/220 |
| 2012/0101960 A1* | 4/2012 | Chassang | G06Q 40/00 705/36 R |
| 2013/0122885 A1 | 5/2013 | Kojima | |
| 2017/0032283 A1 | 2/2017 | Kamiya | |
| 2017/0091667 A1 | 3/2017 | Yukawa | |
| 2017/0372226 A1* | 12/2017 | Costa | G06N 20/00 |

FOREIGN PATENT DOCUMENTS

| | | | |
|---|---|---|---|
| JP | 2006-302282 A | | 11/2006 |
| JP | 2013106202 A | | 5/2013 |
| JP | 3259303 A | * | 8/2016 |
| JP | 5969676 B1 | * | 8/2016 |
| JP | 5969676 B1 | | 8/2016 |
| JP | 5997330 B1 | | 9/2016 |

* cited by examiner

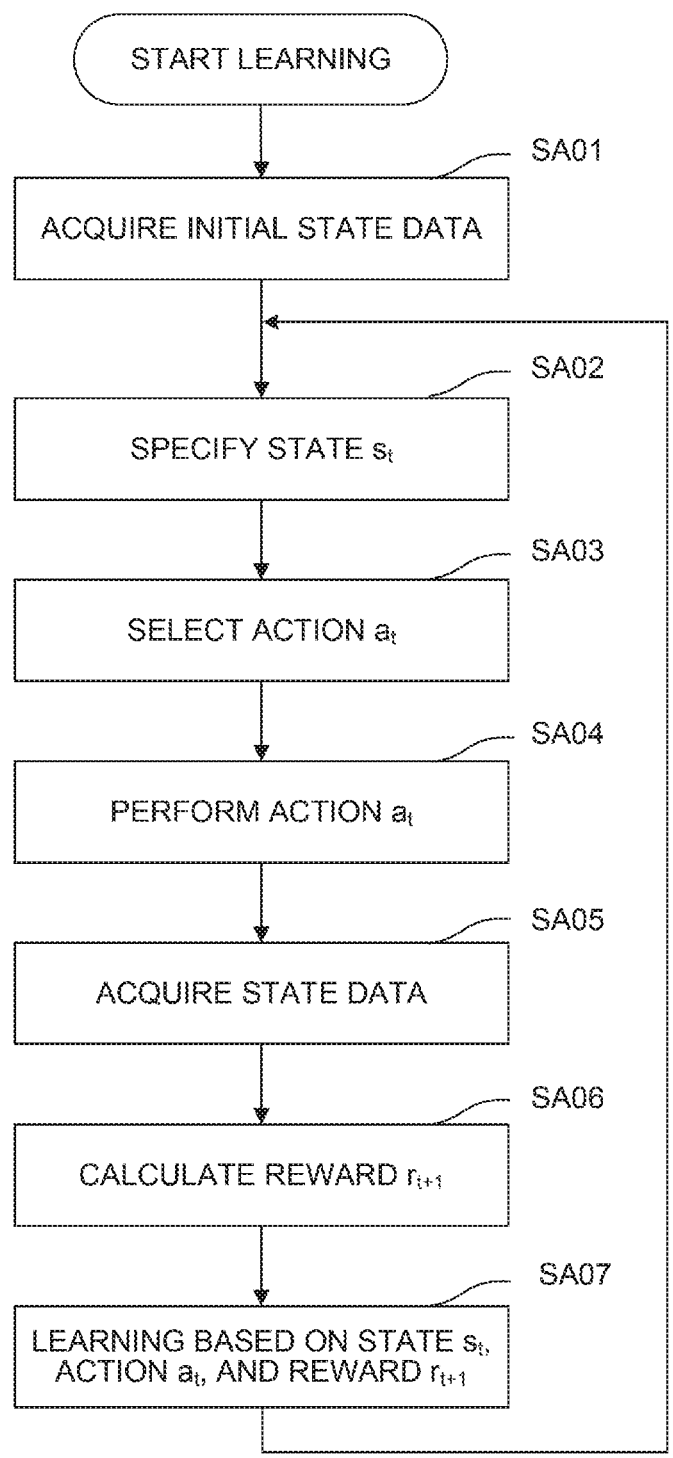

CONTROL SYSTEM AND MACHINE LEARNING DEVICE

CROSS-REFERENCE TO RELATED APPLICATIONS

This application is a new U.S. patent application that claims benefit of Japanese Patent Application No. 2016-242572, filed Dec. 14, 2016, the disclosure of this application is being incorporated herein by reference in its entirety for all purposes.

BACKGROUND OF THE INVENTION

1. Field of the Invention

The present invention relates to a control system and a machine learning device and, in particular, to a controller and a machine learning device that perform machine learning to optimize servo gain in machine control inside a facility.

2. Description of the Related Art

The setting of the servo gain of a controller largely affects the action of a machine to be controlled and directly affects the quality and the productivity of a workpiece. Servo gain is often set and adjusted on a case-by-case basis according to a need using an adjustment tool for each machine under machining conditions such as a workpiece, a tool, accuracy, cycle time, weight of a mold, and viscosity of a resin, and the optimization of the servo gain requires time. Further, in some situations, gain is desirably switched to an optimum one during an operation on a case-by-case basis according to an operating state.

As the servo gain of a controller, various types such as current loop gain, speed loop gain, position loop gain, and pressure control proportional/integral gain exist. Conventionally, there has been a need to separately set gain at an optimum value using an adjustment tool or the like depending on various conditions such as rigidity of a machine, a load inertia, a type of a tool, and an action mode. In addition, there has been a need to readjust gain to an optimum one depending on a priority factor such as machining accuracy and a speed.

As a related art relating to the adjustment of servo gain, Japanese Patent Application Laid-open No. 3-259303 discloses a system that performs an adjustment in the control of a machine action using a neural network. In addition, Japanese Patent Application Laid-open No. 2006-302282 discloses a technology for acquiring the performance data of a separate robot and optimizing a control program including control gain according to the performance goal of a user.

In the adjustment of servo gain, it is often difficult to estimate optimum gain before an operation due to the action conditions and the action environments of a machine to be controlled such as rigidity of the machine, a target workpiece, a tool, a jig, weight of a mold, and the affect of the viscosity of a resin during injection molding. In addition, it is often difficult to estimate optimum gain before an operation since a priority factor for setting gain such as a shape error, productivity, consumption power, and a load on a machine is different on a case-by-case basis. Such problems may not be addressed by the technologies disclosed in Japanese Patent Application Laid-open No. 3-259303 and Japanese Patent Application Laid-open No. 2006-302282.

SUMMARY OF THE INVENTION

In view of the above problems, it is an object of the present invention to provide a controller and a machine learning device that perform machine learning to optimize the servo gain of a machine inside a facility in accordance with action conditions, action environments, and a priority factor of the machine.

In the present invention, a machine learning device is introduced into a control apparatus or a field computer placed in a rank higher than a plurality of controllers to perform machine learning so that a priority factor is optimized based on information (position deflection, cycle time, a motor load, consumption power, a speed fluctuation rate, or the like) on each axis and information (characteristics of a motor, rigidity of the machine, a type of a workpiece, viscosity of a resin, a used tool, a jig, weight and a shape of a mold, a type and viscosity of a resin, or the like) on the operating conditions of each machine collected from the controller of the machine. In the control system of the present invention, an estimated initial value of optimum gain is set in a controller according to the operating conditions of each machine and the latest data of a value function, and a reward based on information on each axis obtained from the controller is calculated and used in the leaning of a machine learning device. In the control system of the present invention, a plurality of value functions used in machine learning may be stored in advance according to at least a priority factor, and an optimum one of the value functions may be selectively used from a data base according to a situation.

A control system according to an embodiment of the present invention has at least one machine that machines a workpiece and a high-order apparatus that adjusts servo gain used in machining by the machine. The control system includes: a machine learning device that performs machine learning of an adjustment of the servo gain of the machine, wherein the machine learning device has: a state observation section that observes machine information on the machine as state data; a determination data acquisition section that acquires information on machining by the machine as determination data; a reward calculation section that calculates a reward based on the determination data and preset reward conditions; a learning section that performs the machine learning of the adjustment of the servo gain of the machine; a decision making section that determines an action of adjustment of the servo gain of the machine, based on the state data and a machine learning result of the adjustment of the servo gain of the machine by the learning section; and a gain changing section that changes the servo gain of the machine, based on the action of adjustment of the servo gain determined by the decision making section; and the learning section performs the machine learning of the adjustment of the servo gain of the machine, based on the state data, the action of adjustment, and the reward calculated after the action of adjustment.

The control system further includes a value function switching determination section that switches a value function used in the machine learning and the determination of the action of adjustment, based on a priority factor preset to the machine. In addition, a positive reward or a negative reward is calculated based on a reward condition set correspondingly to the priority factor. In addition, the control system is connected to at least one another high-order apparatus and mutually exchanges or shares the machine learning result with the other high-order apparatus. A machine learning device according to another embodiment of the present invention performs machine learning of an adjustment of servo gain used in machining by at least one machine that machines a workpiece. The machine learning device includes: a state observation section that observes machine information on the machine as state data; a determination data acquisition section that acquires information on machining by the machine as determination data; a reward calculation section that calculates a reward based on the determination data and preset reward conditions; a learning section that performs the machine learning of the adjustment of the servo gain of the machine; a decision making section that determines an action of adjustment of the servo gain of the machine, based on the state data and a machine learning result of the adjustment of the servo gain of the machine by the learning section; and a gain changing section that changes the servo gain of the machine, based on the action of adjustment of the servo gain determined by the decision making section, wherein the learning section performs the machine learning of the adjustment of the servo gain of the machine, based on the state data, the action of adjustment, and the reward calculated after the action of adjustment. The machine learning device further includes: a value function switching determination section that switches a value function used in the machine learning and the determination of the action of adjustment, based on a priority factor preset to the machine. According to an embodiment of the present invention, it is possible to estimate the combination of gain that improves a priority factor with respect to each machine that is to be controlled and apply an estimated result to machine control by a controller to improve the priority factor in the machine in real time and automatically. In addition, since an operator has no need to adjust gain for each machine and may automatically optimize the gain of all machines in an edge environment and in a unified way, time and effort for adjusting the gain may be eliminated. Moreover, since a value function is updated by the operating conditions of a separate machine and an estimated result of optimum gain and the shared value function may be used in the learning of another machine, the optimum gain may be automatically and efficiently estimated and set.

BRIEF DESCRIPTION OF THE DRAWINGS

The above and other objects and features of the present invention will become apparent from the descriptions of the following embodiments with reference to the accompanying drawings in which;

FIG. 6 is a flowchart showing the flow of the machine learning according to the embodiment of the present invention.

DETAILED DESCRIPTION OF THE PREFERRED EMBODIMENTS

Figure 1:
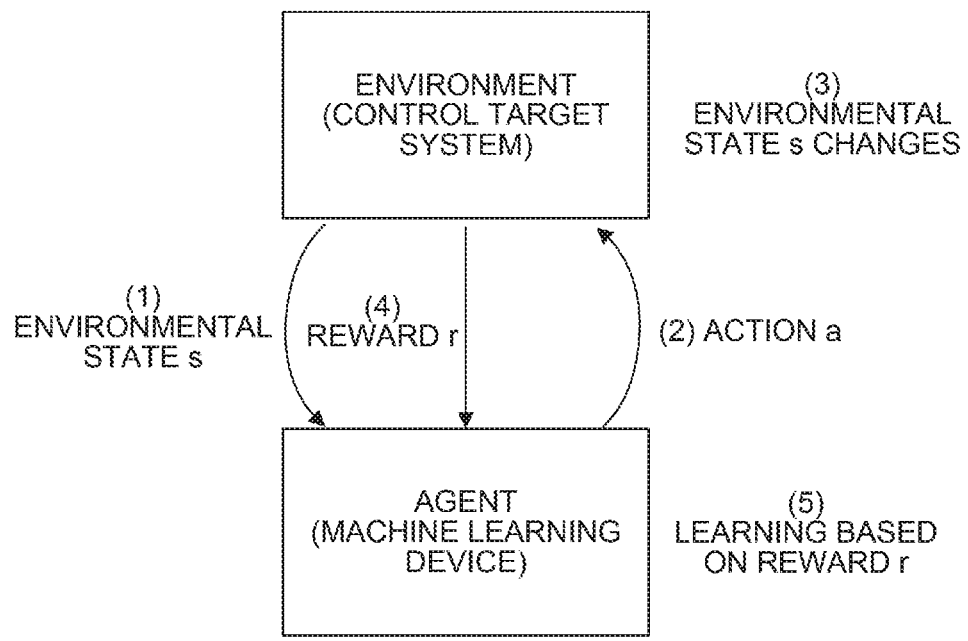
FIG. 1 is a diagram for describing the basic concept of a reinforcement learning algorithm.

Hereinafter, a description will be given of embodiments of the present invention with reference to the drawings.

In the present invention, a machine learning device acting as artificial intelligence is introduced into a high-order apparatus (such as a control apparatus and a field computer) placed in a rank higher than at least one or more controllers that control respective machines to perform the machine learning of the adjustment of servo gain used in the control the machines by the respective controllers with respect to information on respective axes, machine operating conditions, and priority factors. Thus, the combination of gain by which the priority factors are improved may be automatically calculated.

Hereinafter, a description will be briefly given of machine learning to be introduced into the present invention.

1. Machine Learning

Here, machine learning will be briefly described. The machine learning is realized in such a way that useful rules, knowledge expressions, determination criteria, or the like are extracted by analysis from sets of data input to a device that performs the machine learning (hereinafter called a machine learning device), determination results of the extraction are output, and learning of knowledge is performed. Although the machine learning is performed according to various methods, the methods are roughly classified into "supervised learning," "unsupervised learning," and "reinforcement learning." In addition, in order to realize such methods, there is a method called "deep learning" by which to learn the extraction of feature amounts per se.

The "supervised learning" is a model by which sets of input and result (label) data are given to a machine learning device in large amounts to learn the features of the data sets and estimate results from inputs, i.e., a method by which to learn the relationship between inputs and results may be inductively obtained. The method may be realized using an algorithm such as a neural network that will be described later.

The "unsupervised learning" is a learning method by which a device learns, with the reception of only large amounts of input data, as to how the input data is distributed and applies compression, classification, shaping, or the like to the input data even if corresponding supervised output data is not given. The features of the data sets may be arranged in clusters as two of a kind. Using the results, any standard is set to allocate outputs so as to be optimized. Thus, the prediction of the outputs may be realized. In addition, as an intermediate problem setting between the "unsupervised learning" and the "supervised learning," there is a method called "semi-supervised learning" in which some parts are given sets of input and output data while the other part is given only input data. In an embodiment, since data that may be acquired even if a machining machine does not actually operate is used in the unsupervised learning, learning may be efficiently performed.

The "reinforcement learning" is a method by which to learn not only determinations or classifications but also actions to perform learning of optimum actions in consideration of interactions given to environments by actions, i.e., learning to maximize rewards that will be obtained in the future. In the reinforcement learning, a machine learning device may start learning in a state in which the machine learning device does not completely know or imperfectly knows results brought about by actions. In addition, a machine learning device may start learning from a desirable start point in an initial state in which prior learning (a method such as the above supervised learning and inverse reinforcement learning) is performed in such a way as to imitate human's actions.

Note that when machine learning is applied to a machining machine, it is necessary to consider the fact that results may be obtained as data only after the machining machine actually operates, i.e., searching of optimum actions is performed by a trial and error approach. In view of the above circumstances, the present invention employs, as the principal learning algorithm of a machine learning device, the algorithm of reinforcement learning by which the machine learning device is given rewards to automatically learn actions to achieve a goal.

FIG. 1 is a diagram for describing the basic concept of a reinforcement learning algorithm. In reinforcement learning, agent learning and an action are advanced by the interactions between an agent (machine learning device) acting as a learning subject and an environment (control target system) acting as a control target. More specifically, the following interactions are performed between the agent and the environment.

(1) The agent observes an environmental state $s_t$ at certain time.

(2) The agent selects and performs an action $a_t$ that he/she is allowed to take based on an observation result and past learning.

(3) The environmental state $s_t$ changes to a next state $s_{t+1}$ after any rule and the action $a_t$ are performed.

(4) The agent accepts a reward $r_{t-1}$ based on the state change as a result of the action $a_t$.

(5) The agent advances the learning based on the state $s_t$, the action $a_t$, the reward $r_{t+1}$, and a past learning result.

At the initial stage of the reinforcement learning, the agent does not understand the standard of a value determination for selecting the optimum action $a_t$ with respect to the environmental state $s_t$ in the above action selection (2). Therefore, the agent selects various actions $a_t$ in a certain state $s_t$ and learns the selection of a better action, i.e., the standard of an appropriate value determination based on rewards $r_{t-1}$ given with respect to the actions $a_t$ at that time.

In the learning of the above machining (5), the agent acquires the mapping of an observed state $s_t$, an action $a_t$, and a reward $r_{t+1}$ as reference information for determining an amount of a reward that he/she is allowed to obtain in the future. For example, when the number of states that the agent is allowed to take at each time is m and the number of actions that the agent is allowed to take is n, the agent obtains a two-dimensional arrangement of m×n, in which rewards $r_{t+1}$ corresponding to pairs of states $s_t$ and actions $a_t$ are stored, by repeatedly performing actions.

Then, with a value function (evaluation function) indicating to what degree a state or an action selected based on the above acquired mapping is valuable, the agent updates the value function (evaluation function) while repeatedly performing actions to learn an optimum action corresponding to a state.

A "state value function" is a value function indicating to what degree a certain state $s_t$ is valuable. The state value function is expressed as a function using a state as an argument and updated based on a reward obtained with respect to an action in a certain state, a value of a future state changed with the action, or the like in learning from repeated actions. The update formula of the state value function is defined according to a reinforcement learning algorithm. For example, in temporal-difference (TD) learning indicating as one of reinforcement learning algorithms, the state value function is updated by the following Formula 1. Note that in Formula 1, α is called a learning coefficient, γ is called a discount rate, and the learning coefficient and the discount rate are defined to fall within 0<α≤1 and 0<γ≤1, respectively.

$$V(s_t) \leftarrow V(s_t) + \alpha[r_{t+1} + \gamma V(s_{t+1}) - V(s_t)] \quad \text{[Math. 1]}$$

In addition, an "action value function" is a value function indicating to what degree an action $a_t$ is valuable in a certain state $s_t$. The action value function is expressed as a function using a state and an action as arguments and updated based on a reward obtained with respect to an action in a certain state, an action value of a future state changed with the action, or the like in learning from repeated actions. The update formula of the action value function is defined according to a reinforcement learning algorithm. For example, in Q-learning indicating as one of typical reinforcement learning algorithms, the action value function is updated by the following Formula 2. Note that in Formula 2, α is called a learning coefficient, γ is called a discount rate, and the learning coefficient and the discount rate are defined to fall within 0<α≤1 and 0<γ≤1, respectively.

$$Q(s_t, a_t) \leftarrow Q(s_t, a_t) + \alpha\left(r_{t+1} + \gamma \max_a Q(s_{t+1}, a) - Q(s_t, a_t)\right) \quad \text{[Math. 2]}$$

Formula 2 expresses a method for updating an evaluation value $Q(s_t, a_t)$ of an action $a_t$ in a state $s_t$ based on a reward $r_{t+1}$ returned as a result of the action $a_t$. It is indicated by Formula 2 that $Q(s_t, a_t)$ is increased if an evaluation value $Q(s_{t-1}, \max(a))$ of the best action max(a) in a next state as a result of the reward $r_{t+1}$ and the action $a_t$ is larger than the evaluation value $Q(s_t, a_t)$ of the action $a_t$ in the state $s_t$, while $Q(s_t, a_t)$ is decreased if not. That is, a value of a certain action in a certain state is made closer to a value of a reward immediately returned as a result of the action and the best action in a next state accompanied by the action.

In Q-learning, such an update is repeatedly performed to finally set $Q(s_t, a_t)$ at an expected value $E[\Sigma\gamma^t r_t]$ (the expected value is one taken when a state is changed according to an optimum action. Since the expected value is unknown as a matter of course, it is necessary to learn the expected value by search).

Further, in the selection of an action in the above machining (2), an action $a_t$ by which a reward $(r_{t+1}+r_{t+2}+\ldots)$ over a future becomes maximum in a current state $s_t$ (an action for changing to a most valuable state when a state value function is used or a most valuable action in the state when an action value function is used) is selected using a value function (evaluation function) generated by past learning. Note that during learning, an agent may select a random action with a constant probability for the purpose of advancing the learning in the selection of an action in the above machining (2) (ε greedy method).

Note that in order to store a value function (evaluation function) as a learning result, there are a method for retaining values of all the pairs (s, a) of states and actions in a table form (action value table) and a method for preparing a function for approximating the above value function. According to the latter method, the above update formula may be realized by adjusting parameters of an approximate function based on a method such as stochastic gradient descent. For the approximate function, a supervised learning device such as a neural network may be used.

Figure 2:
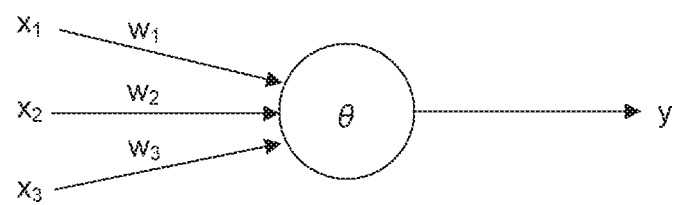
FIG. 2 is a schematic diagram showing a neuron model.

The neural network is constituted by a calculation unit, a memory, or the like that realizes a neural network following a neuron model as shown in, for example, FIG. 2. FIG. 2 is a schematic diagram showing a neuron model.

As shown in FIG. 2, a neuron outputs an output y with respect to a plurality of inputs x (here, inputs $x_1$ to $x_3$ as an example). Correspondingly to input x, a weight w ($w_1$ to $w_3$) is placed on each of the inputs $x_1$ to $x_3$. Thus, the neuron outputs the output y expressed by the following Formula 3. Note that in the following Formula 3, an input x, an output y, and a weight w are all vectors. In addition, θ indicates a bias, and $f_k$ indicates an activation function.

$$y=f_k(\Sigma_{i=1}^n x_i w_i - \theta)$$ [Math. 3]

Figure 3:
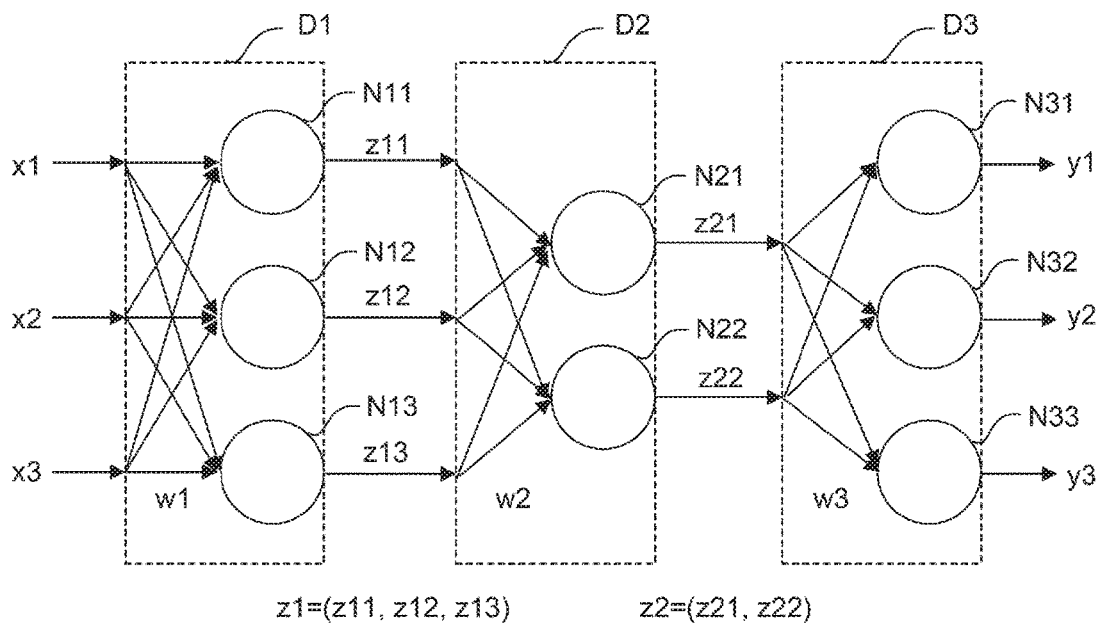
FIG. 3 is a schematic diagram showing a neural network having weights of three layers.

Next, a description will be given, with reference to FIG. 3, of a neural network having weights of three layers in which the above neurons are combined together. FIG. 3 is a schematic diagram showing a neural network having weights of three layers D1 to D3. As shown in FIG. 3, a plurality of inputs x (here, inputs x1 to x3 as an example) is input from the left side of the neural network, and results y (here, results y1 to y3 as an example) are output from the right side of the neural network.

Specifically, when the inputs x1 to x3 are input to three neurons N11 to N13 respectively, weights are placed correspondingly on the inputs x1 to x3. The weights placed on the inputs are collectively indicated as w1. The neurons N11 to N13 output z11 to z13, respectively.

Z11 to Z13 are collectively indicated as a feature vector z1, and may be regarded as vectors obtained by extracting feature amounts of the input vectors. The feature vector z1 is a feature vector between the weight w1 and a weight w2.

When z11 to z13 are input to two neurons N21 and N22 respectively, weights are placed correspondingly on z11 to z13. The weights placed on the feature vectors are collectively indicated as w2. The neurons N21 and N22 output z21 and z22, respectively. z21 and z22 are collectively indicated as a feature vector z2. The feature vector z2 is a feature vector between the weight w2 and a weight w3.

When the feature vectors z21 and z22 are input to three neurons N31 to N33 respectively, weights are placed correspondingly on the feature vectors z21 and z22. The weights placed on the feature vectors are collectively indicated as w3.

Finally, the neurons N31 to N33 output the results y1 to y3, respectively.

The action of the neural network includes a learning mode and a prediction mode. A learning data set is used to learn the weight w in the learning mode, and the parameters are used to determine the action of a machining machine in the prediction mode (here, "prediction" is only for the sake of convenience, but various tasks such as detection, classification, and deduction may be performed).

It is possible to immediately learn data obtained when a controller actually controls a machine in the prediction mode and reflect the learning data on a next action (online learning), or is possible to perform collective learning using a previously-collected data group and thereafter perform a detection mode using the parameters at all times (batch learning). It is also possible to perform an intermediate mode, i.e., a learning mode that is performed every time data is accumulated by a certain degree.

Learning of the weights w1 to w3 is made possible by back propagation. Error information enters from the right side and flows to the left side. The back propagation is a method for adjusting (learning) each of the weights to reduce a difference between the output y obtained when the input x is input and a real output y (supervised) for each of the neurons.

The neural network may have three or more layers (called deep learning). It is possible to automatically obtain a calculation unit that extracts the features of inputs on a step-by-step basis and performs the regression of a result only from supervised data.

When such a neural network is used as an approximate function, the above value function (evaluation function) may be stored as the neural network to advance learning while the above machining (1) to (5) in the above reinforcement learning is repeatedly performed.

Even in a new environment after the completion of learning in a certain environment, a machine learning device may generally advance the learning so as to be adapted to the new environment by performing additional learning. Accordingly, as in the present invention, by the application of learning to the adjustment of servo gain used to control a machine by each controller, additional learning under new machining preconditions is performed based on the learning of the adjustment of past servo gain. Thus, it becomes possible to perform the learning of the adjustment of servo gain in a short period of time.

In addition, reinforcement learning employs a system in which a plurality of agents is connected to each other via a network or the like, and information on states s, actions a, rewards r, or the like is shared between the agents and applied to each learning, whereby each of the agents performs dispersed reinforcement learning in consideration of the environments of the other agents to be able to perform efficient learning. Also in the present invention, when a plurality of agents (machine learning devices) incorporated in a plurality of environments (numerical controllers of lathe machining machines) performs dispersed machine learning in a state of being connected to each other via a network or the like, learning of the adjustment of a machining path of a turning cycle command and machining conditions in the numerical control controllers of the lathe machining machines may be efficiently performed.

Note that although various methods such as Q-learning, an SARSA method, TD learning, and an AC method have been commonly known as reinforcement learning algorithms, any of the above reinforcement algorithms may be applied to the present invention. Since each of the reinforcement learning algorithms has been commonly known, its detailed description will be omitted in the specification.

Hereinafter, a description will be given, based on a specific embodiment, of the control system of the present invention into which a machine learning device is introduced.

2. Embodiment

Figure 4:
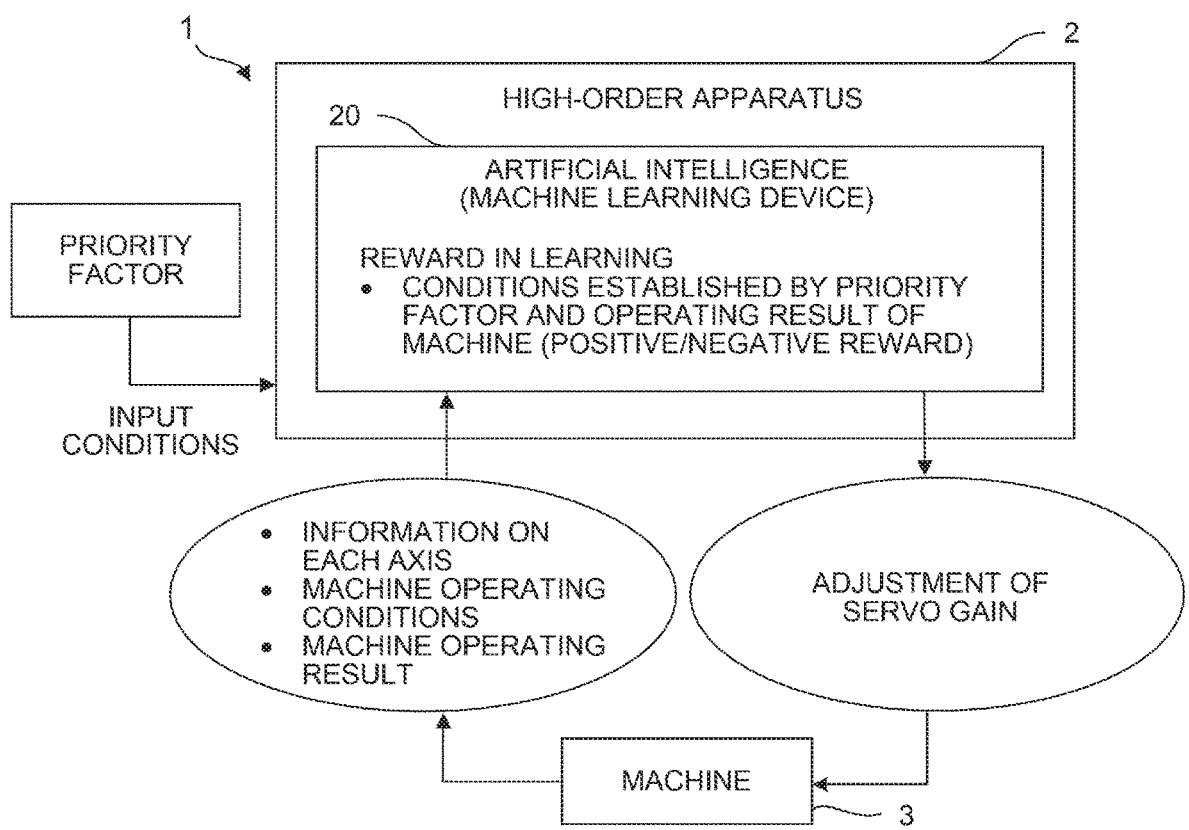
FIG. 4 is a diagram showing an image on the machine learning of a control system according to an embodiment of the present invention.

FIG. 4 is a diagram showing an image on the machine learning of the adjustment of servo gain used to control a machine by each controller in a control system into which a machine learning device according to an embodiment of the present invention is introduced. Note that in FIG. 4, only configurations necessary for describing the machine learning in the control system of the embodiment are shown.

In the embodiment, information on each axis and machine operating conditions acquired from a machine 3 indicating state information are input to a machine learning device 20 as information used by the machine learning device 20 to specify an environment (the state $s_t$ described in 1. Machine Learning).

In the embodiment, the machine learning device 20 outputs the action of adjustment of servo gain used to control the machine by each controller as an output to an environment (the action $a_t$ described in 1. Machine Learning).

In a control system 1 according to the embodiment, the above state information is defined by the information on each axis and the machine operating conditions acquired from the machine 3. Further, the above action of adjustment may be defined by an adjustment amount of the servo gain used to control the machine output from the machine learning device 20.

In addition, in the embodiment, a condition (positive/negative reward) defined by a priority factor and an operating result of the machine 3 is employed as a reward (the reward $r_t$ described in 1. Machine Learning) to be given to the machine learning device 20. Note that an operator may appropriately set as to which data is used to determine a reward.

Moreover, in the embodiment, the machine learning device 20 performs machine learning based on state information (input data), an action of adjustment (output data), and a reward described above. In the machine learning, a state $s_t$ is defined by the combination of input data at certain time t, the adjustment of servo gain performed with respect to the defined state $s_t$ is equivalent to an action $a_t$, and a value evaluated and calculated based on data on a machine operating result newly obtained as a result of the adjustment of the servo gain with the action $a_t$ is equivalent to a reward $r_{t+1}$. As in 1. Machine Learning described above, a state $s_t$, an action $a_t$, and a reward $r_{t+1}$ are applied to the update formula of a value function (evaluation function) corresponding to a machine learning algorithm to advance the learning.

Hereinafter, a description will be given of a function block diagram of the control system.

Figure 5:
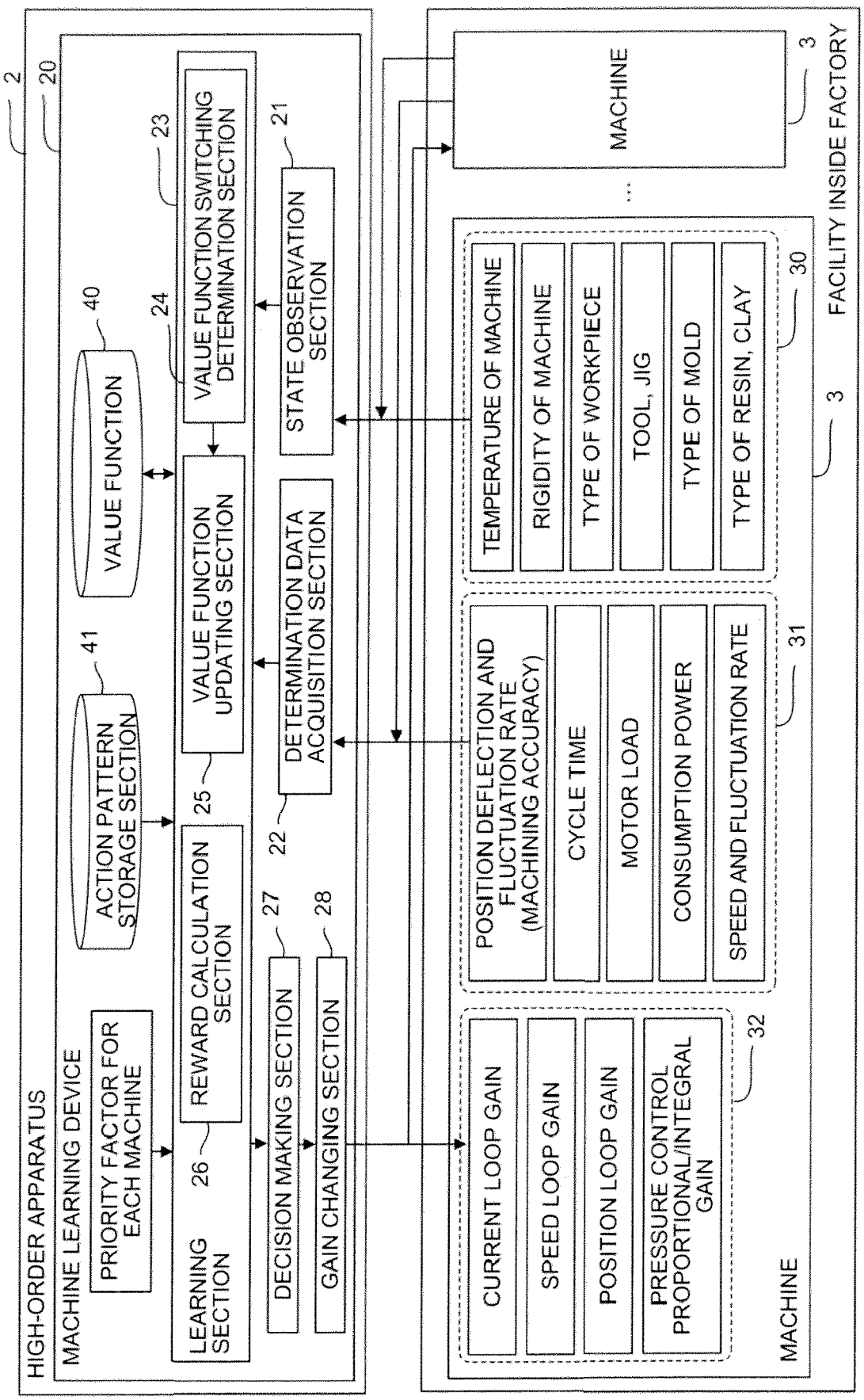
FIG. 5 is a schematic function block diagram of the control system according to the embodiment of the present invention.

FIG. 5 is the function block diagram of the control system according to the embodiment. When configurations shown in FIG. 5 are compared with the elements in the reinforcement learning shown in FIG. 1, the machine learning device 20 corresponds to the agent and configurations such as the machine 3 other than the machine learning device 20 correspond to the environment.

The control system 1 according to the embodiment is constituted by a high-order apparatus 2 having the machine learning device 20 and at least one machine 3. Further, the high-order apparatus 2 is an apparatus placed in a rank higher than controllers that control the machines 3, and examples of the high-order apparatus 2 include a control apparatus, a field computer, a host computer, or the like.

Each of the machines 3 acting as a facility inside a factory according to the embodiment has a machine information output section 30, a machining information output section 31, and a servo gain setting section 32. The machine information output section 30 acquires information on the machine 3 such as temperature and rigidity of the machine 3, a type of a workpiece to be machined, a tool and a jig used in machining, a type of a mold, and types of a resin and clay used in machining and outputs the acquired information to the high-order apparatus 2. The machining information output section 31 acquires information on machining such as a position deflection rate and a fluctuation rate of an axis, machining cycle time, a maximum motor load value, consumption power, and a speed and a fluctuation rate of a motor and outputs the acquired information to the high-order apparatus 2. The servo gain setting section 32 sets servo gain such as current loop gain, speed loop gain, position loop gain, and pressure control proportional/integral gain.

The machine information output section 30 acquires information on the machine 3 from a setting memory (not shown) of the machine 3, a sensor (not shown) provided in each section of the machine 3, or the like and outputs the acquired information on the machine 3 in response to a request from the high-order apparatus 2.

The machining information output section 31 monitors an output or the like of a sensor or a servo motor (not shown) provided in each section of the machine 3 when machining is performed, generates information on the machining based on data monitored at, for example, a timing at which one-cycle machining is completed, and outputs the generated information on the machining to the high-order apparatus 2.

The servo gain setting section 32 sets the servo gain of a servo motor provided in the machine 3 in response to a request from the high-order apparatus 2. For the setting of servo gain, current loop gain, speed loop gain, position loop gain, pressure control proportional/integral gain, or the like may be set.

The machine learning device 20 that performs machine learning performs the action of adjustment of the servo gain of the machine 3 when machining by the machine 3 is started, and performs the learning of the action of adjustment when the machining by the machine 3 with the servo gain adjusted by the action of adjustment is completed.

The machine learning device 20 that performs machine learning has a state observation section 21, a determination data acquisition section 22, a learning section 23, a value function switching determination section 24, a value function updating section 25, a reward calculation section 26, a decision making section 27, and a gain changing section 28. The machine learning device 20 may be incorporated in the high-order apparatus 2 as shown in FIG. 5 or may be constituted by a personal computer or the like connected to the high-order apparatus 2.

The state observation section 21 is a function unit that observes machine information output from the machine information output section 30 provided in the machine 3 as state data and acquires the observed information inside the machine learning device 20. The state observation section 21 outputs the observed state data to the learning section 23. The state observation section 21 may temporarily store the observed state data on a memory (not shown) to be managed. The state data observed by the state observation section 21 may be data acquired by the latest machining operation of the machine 3 or may be data acquired by the past machining operation of the machine 3.

The determination data acquisition section 22 is a function unit that acquires machining information output from the machining information output section 31 provided in the machine 3 inside the machine learning device 20 as determination data. The determination data acquisition section 22 outputs the acquired determination data to the learning section 23. The determination data acquisition section 22 may temporarily store the acquired determination data on the memory (not shown) to be managed together with state data acquired by the state observation section 21. The determination data acquired by the determination data acquisition section 22 may be data acquired by the latest machining operation of the machine 3 or may be data acquired by the past machining operation of the machine 3.

The learning section 23 performs the machine learning (reinforcement learning) of the action of adjustment of servo gain with respect to machine information and machining information for each priority factor based on state data observed by the state observation section 21, determination data acquired by the determination data acquisition section 22, and a reward calculated by the reward calculation section 26 that will be described later. In the machine learning performed by the learning section 23, a state $s_t$ is defined by the combination of state data at certain time t, the determination of the action of adjustment of the servo gain of the machine 3 by the decision making section 27 that will be described later and the adjustment of the servo gain of the machine 3 by the gain changing section 28 that will be described later according to the defined state $s_t$ are equivalent to an action $a_t$, and a value calculated by the reward calculation section 26 that will be described later based on the determination data acquired by the determination data acquisition section 22 as a result of the adjustment of the servo gain of the machine 3 and the machining of the machine 3 is equivalent to a reward $r_{t+1}$. A value function used in the learning is determined according to an applied learning algorithm. For example, when Q-learning is used, it is only necessary to update an action value function $Q(s_t, a_t)$ according to the above Formula 2 to advance the learning.

The value function switching determination section 24 performs the determination of the action of adjustment of servo gain with respect to the machine 3 and the switching of a value function used in machine learning based on a result of the action of adjustment of the servo gain with respect to the machine 3 based on the priority factor of each machine 3 set by a user. In a value function storage section 40 provided on the memory (not shown) of the machine learning device 20, a plurality of value functions different for each priority factor of the machine is stored in advance. The value function switching determination section 24 selectively switches a value function to be used by the learning section 23, the value function updating section 25, and the decision making section 27 according to a priority factor set in the machine 3 that performs the action of adjustment of servo gain (or the machine 3 that performs the machine learning of the action of adjustment of the servo gain). By the switching of a value function for each priority factor with the value function switching determination section 24 as described above, an improvement in the efficiency of the machine learning may be achieved.

The value function updating section 25 stores a result of machine learning performed by the learning section 23 in the value function storage section 40 after applying the same to a value function selected by the value function switching determination section 24. The value function acting as the learning result stored in the value function storage section 40 by the value function updating section 25 is used in machine learning and the determination of the action of adjustment of servo gain from the next time. As described above, a learning result may be stored in such a way that a value function corresponding to a machine learning algorithm to be used is stored in a supervised learning device such as a support vector machine (SVM) and a neural network of an approximate function, an arrangement, or a multiple-value output.

The reward calculation section 26 performs the calculation of a reward to be used in machine learning based on reward conditions preset on the memory (not shown) and determination data acquired by the determination data acquisition section 22.

Hereinafter, a description will be given of an example of reward conditions set in the embodiment. Note that the following reward conditions are given only as examples and may be changed in terms of design. Alternatively, various other reward conditions may be set.

Reward 1: Improvement in Machining Quality (Positive/Negative Reward)

When the machining accuracy of a machined workpiece falls within a proper range preset in a case in which the priority factor of the machine 3 is set to an improvement in machining quality, a positive reward is given. On the other hand, when the machining accuracy falls outside the proper range preset (when the machining accuracy is too bad or the machining accuracy is too good), a negative reward is given according to the degree. Note that as for giving a negative reward, a large negative reward may be given when the machining accuracy is too bad and a small negative reward may be given when the machining accuracy is too good.

Reward 2: Improvement in Productivity (Positive/Negative Reward)

When cycle time is not largely deviated from a prescribed reference value preset in a case in which the priority factor of the machine 3 is set to an improvement in productivity, a small positive reward is given. When the cycle time is shorter than the prescribed reference value set in advance, a positive reward is given according to the degree. On the other hand, when the cycle time is longer than the prescribed reference value set in advance, a negative reward is given according to the degree.

Reward 3: Energy-Saving Performance (Positive/Negative Reward)

When consumption power is not largely deviated from a prescribed reference value set in advance in a case in which the priority factor of the machine 3 is set to energy-saving performance, a small positive reward is given. When the consumption power is smaller than the prescribed reference value set in advance, a positive reward is given according to the degree. On the other hand, when the consumption power is larger than the prescribed reference value set in advance, a negative reward is given according to the degree.

The above reward conditions are preferably used in combination according to the priority factor rather than being used singly. For example, when the priority factor is set to an improvement in machining quality, merely setting a reward condition on the improvement in the machining quality does not suffice. That is, if reward conditions on an improvement in productivity and energy-saving performance are also set at the same time and an amount of a reward obtained when the reward condition on the improvement in the machining quality is satisfied is set at a value larger than an amount of a reward obtained when the reward conditions on the improvement in the productivity and the energy-saving performance are satisfied, the selection of an action of adjustment to maintain minimum productivity and energy-saving performance may be learned while the machining quality being prioritized. The same applies to a case in which the priority factor is set to an improvement in productivity or energy-saving performance.

The decision making section 27 determines the action of adjustment of the servo gain of the machine 3 based on a learning result learned by the learning section 23 (and stored in the value function storage section 40) and state data observed by the state observation section 21. The determination of the action of adjustment of the servo gain here is equivalent to an action a used in machine learning. The action of adjustment of the servo gain may be performed in such a way that the selection of a type (current loop gain, speed loop gain, position loop gain, or pressure control proportional/integral gain) of the gain to be adjusted and an adjustment degree of the type of the selected gain are combined together, respective combinations are stored and prepared in an action pattern storage section 41 as selectable actions (for example, an action 1=the current loop gain is set at XX, an action 2=the speed loop gain is set at +YY, . . . ), and an action by which the largest reward will be obtained in the future based on a past learning result is selected. The selectable actions may be actions by which a plurality of types of servo gain is adjusted at the same time or may be actions by which the servo gain of a plurality of servo motors provided in the machine 3 is adjusted at the same time. In addition, the above ε greedy method may be employed to select a random action with a constant probability for the purpose of advancing the learning of the learning section 23 that will be described later.

Then, the gain changing section 28 instructs the servo gain setting section 32 of the machine 3 to adjust servo gain based on the action of adjustment of the servo gain of the machine 3 determined by the decision making section 27.

A description will be given, with reference to the flowchart of FIG. 6, of the flow of machine learning performed by the learning section 23.

Step SA01. When the machine learning starts, the state observation section 21 observes machine data output from the machine 3 as state data.

Step SA02. The learning section 23 specifies a current state $s_t$ based on the state data observed by the state observation section 21.

Step SA03. The decision making section 27 selects an action $a_t$ (action of adjustment of the servo gain of the machine 3) based on a past learning result and the state $s_t$ specified in step SA02.

Step SA04. The gain changing section 28 performs the action $a_t$ selected in step SA03.

Step SA05. The state observation section 21 observes machine information on the machine 3 as state information, and the determination data acquisition section 22 acquires machining information on the machine 3 as determination data. At this stage, the state of the machine 3 changes with a temporal transition from time t to time t+1 as a result of the action $a_t$ performed in step SA04.

Step SA06. The reward calculation section 26 calculates a reward $r_{t+1}$ based on the determination data acquired in step SA05.

Step SA07. The learning section 23 advances the machine learning based on the state $s_t$ specified in step SA02, the action $a_t$ selected in step SA03, and the reward $r_{t+1}$ calculated in step SA06 and then returns to step SA02.

As described above, the gain changing section 28 adjusts the servo gain of the machine 3 based on the decision making of the decision making section 27, the machine 3 is controlled by the adjusted servo gain to machine a workpiece, state data is observed by the state observation section 21, determination data is acquired by the determination data acquisition section 22, and the machine learning is repeatedly performed. Thus, a more excellent learning result may be acquired.

When the servo gain of the machine 3 is actually adjusted using learning data that has been sufficiently subjected to the above machine learning, the machine learning device 20 may be operated so as not to perform new learning using the learning data that has been sufficiently subjected to the machine learning as it is.

In addition, the machine learning device 20 that has completed the machine learning (or the machine learning device 20 in which completed learning data on other machine learning devices 20 has been copied) may be attached to other high-order apparatuses 2 and operated using the learning data obtained when the sufficient machine learning was performed.

The machine learning device 20 of the high-order apparatus 2 may perform the machine learning alone. However, when the high-order apparatus 2 provided in each of a plurality of control systems 1 further has a unit used to communicate with an outside, it becomes possible to send/receive and share a value function stored in each of the value function storage sections 40. Thus, the machine learning may be more efficiently performed. For example, parallel learning is advanced between a plurality of the high-order apparatuses 2 in such a way that state data, determination data, and value functions acting as learning results are exchanged between the high-order apparatuses 2 while adjustment targets and adjustment amounts different between the plurality of high-order apparatuses 2 are fluctuated within a prescribed range. Thus, the learning may be more efficiently performed.

In order to exchange state data and learning data between a plurality of high-order apparatuses 2 as described above, communication may be performed via a management apparatus (not shown), the high-order apparatuses 2 may directly communicate with each other, or a cloud may be used. However, for handling large amounts of data, a communication unit with a faster communication speed is preferably provided.

The embodiment of the present invention is described above. However, the present invention is not limited only to the example of the above embodiment and may be carried out in various aspects with appropriate modifications.

For example, the relationships between the respective function units provided in the high-order apparatus 2 described in the above embodiment are not limited to those shown in the function block diagram of FIG. 5. That is, functions may be divided in any unit or any hierarchical relationship may be established between the functions so long as configurations equivalent to the functions of the respective function units are provided.

In addition, the above embodiment describes the adjustment of the servo gain of the servo motor provided in the one machine 3. However, for example, learning may be performed in such a way that the servo gain of a plurality of machines 3 arranged in a factory is adjusted at the same time to attain an improvement in overall energy-saving performance in the factory. In this case, a plurality of actions different in the combination of adjustment amounts or the like is registered in the action pattern storage section 41 with consideration given to the combination of the adjustment of the servo gain of the plurality of machines 3 as an action. Then, the decision making section 27 determines an action so that consumption power obtained from the plurality of machines 3 becomes small, and the learning section 23 learns the determined action. Thus, machine learning that achieves the above object may be performed.

Moreover, the above embodiment describes the configuration in which a value function is switched for each priority factor by the value function switching determination section 24. However, the priority factor may be added to the input data of the learning section 23 to omit the value function switching determination section 24. Thus, the efficiency of the machine learning for each priority factor reduces, but the same effect may be obtained when the machine learning is performed over a longer period of time.

The embodiment of the present invention is described above. However, the present invention is not limited only to the example of the above embodiment but may be carried out in various aspects with appropriate modifications.

The invention claimed is:

1. A control system having at least one machine that machines a workpiece and a high-order apparatus that adjusts servo gain used in machining by the machine, the control system comprising:

a machine learning device including processor that performs machine learning of an adjustment of the servo gain of the machine, wherein the processor is configured to:

observe machine information on the machine as state data;

acquire information on machining by the machine as determination data;

calculate a reward based on the determination data and a plurality of preset reward conditions that are defined by a priority factor preset for the machine according to preferences given in the adjustment of the servo gain;

perform the machine learning of the adjustment of the servo gain of the machine;

determine an action of adjustment of the servo gain of the machine, based on the state data and a machine learning result of the adjustment of the servo gain of the machine;

change the servo gain of the machine based on the action of adjustment of the servo gain; and perform the machine learning of the adjustment of the servo gain of the machine, based on the state data, the action of adjustment, and the reward calculated after the action of adjustment.

2. The control system according to claim 1, wherein the processor is further configured to switch a value function used in the machine learning and the determination of the action of adjustment, based on the priority factor preset for the machine.

3. The control system according to claim 1, wherein a positive reward or a negative reward is calculated based on the plurality of preset reward conditions set correspondingly to the priority factor preset for the machine.

4. The control system according to claim 1, wherein the control system is connected to at least one another high-order apparatus and mutually exchanges or shares the machine learning result with the other high-order apparatus.

5. A machine learning device that performs machine learning of an adjustment of servo gain used in machining by at least one machine that machines a workpiece, the machine learning device comprising:

a processor configured to:

observe machine information on the machine as state data;

acquire information on machining by the machine as determination data;

calculate a reward based on the determination data and a plurality of preset reward conditions that are defined by a priority factor preset for the machine according to preferences given in the adjustment of the servo gain;

perform the machine learning of the adjustment of the servo gain of the machine;

determine an action of adjustment of the servo gain of the machine, based on the state data and a machine learning result of the adjustment of the servo gain of the machine;

change the servo gain of the machine, based on the action of adjustment of the servo gain; and perform the machine learning of the adjustment of the servo gain of the machine, based on the state data, the action of adjustment, and the reward calculated after the action of adjustment.

6. The machine learning device according to claim 5, wherein the processor is further configured to switch a value function used in the machine learning and the determination of the action of adjustment, based on the priority factor preset for the machine.

7. The control system according to claim 1, wherein the priority factor preset for the machine includes at least any one improvement in machining quality, improvement in productivity, and energy saving performance.

8. The control system according to claim 1, wherein the plurality of preset reward conditions are used in combination according to the priority factor preset for the machine.

* * * * *